UNITED STATES PATENT OFFICE.

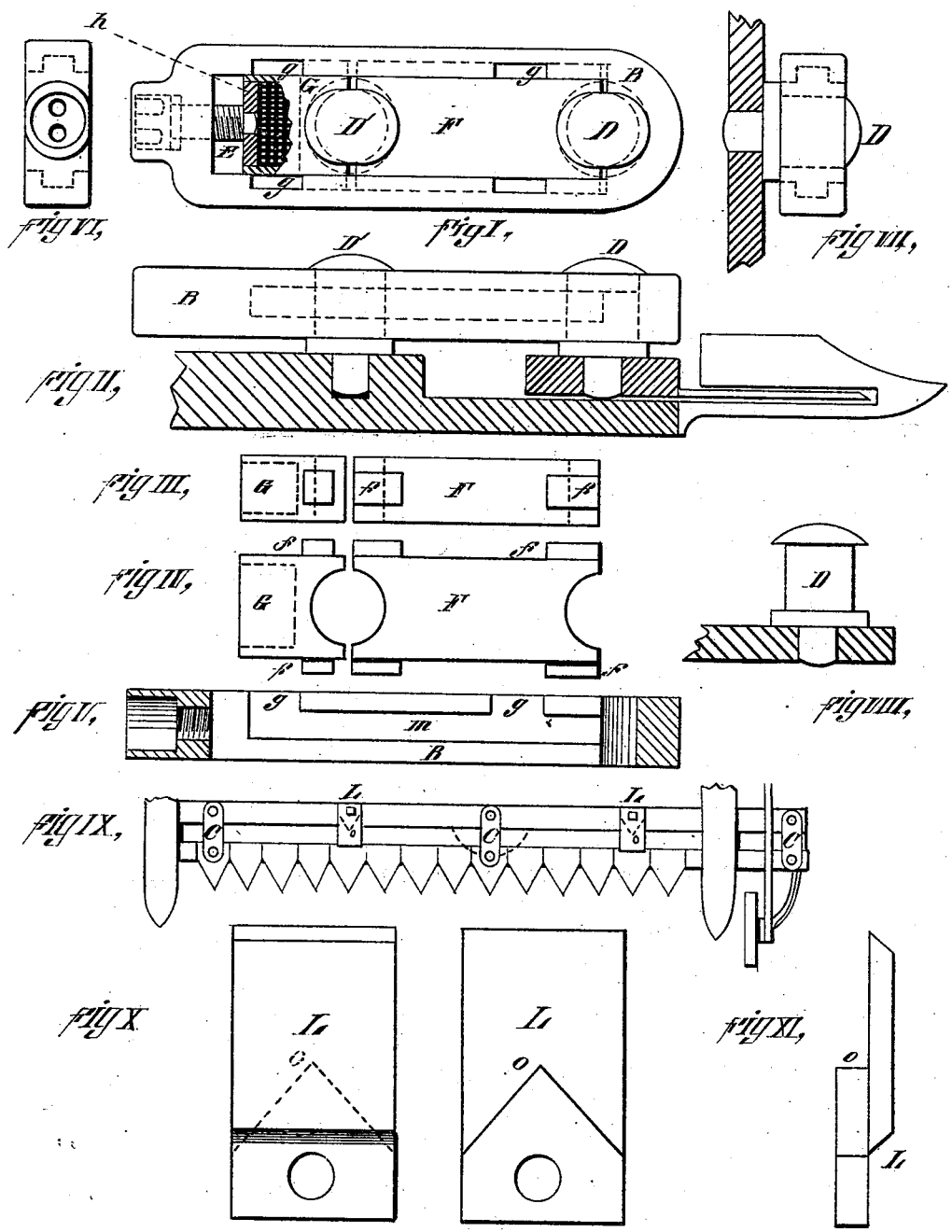

JOSHUA L. ABELL, OF CHICAGO, ILLINOIS.

HARVESTER.

SPECIFICATION forming part of Letters Patent No. 236,400, dated January 11, 1881.

Application filed June 11, 1880. (No model.)

*To all whom it may concern:*

Be it known that I, JOSHUA L. ABELL, of Chicago, Illinois, have invented a new and useful Improvement in Harvesters, (for which no patent has been obtained by me or others, with my knowledge or consent, in any foreign country,) of which the following is a specification.

My invention relates to improvements in the cutting apparatus of that class of harvesters in which the cutter-bar is connected by pivot-joints to arms vibrating about fixed centers to impart an advancing and retreating curvilinear motion to the cutters, and relates more particularly to improvements upon the device for which patent was granted me November 29, 1870, No. 109,569, in which the arms or links were formed of sections of metal inclosing studs, respectively, upon the finger and sickle bars, and made to form journals for the studs by being held together by bands of rubber stretched to inclose them and the studs, and so that the wear of the journals would at equal pace be taken up by the contraction of the rubber.

The objects of my improvements are, first, to provide a connecting-link which shall automatically take up the wear of its journals and pivots and hold them in perfect contact to avoid noise and uneven wear, while capable of being easily adjusted to increase or renew the elasticity of the rubber forming the motive power, and at the same time have an increased strength and length of life from the manner and position in which the rubber is employed; and, second, to provide rub-irons which shall, from their peculiar configuration, assist in insuring a clear cut and complete sweep to the sickles. I attain these objects by the mechanism illustrated in the accompanying drawings, in which—

Figure I is a full-size plan view, with partial section of a connecting-link; Fig. II, a side elevation, with partial section of finger and sickle bars; and Figs. III, IV, V, VI, VII, and VIII are detail views of the link. Fig. IX is a reduced plan view, showing the relative positions of rub-irons and connecting-links upon the finger-bar; and Figs. X and XI are full-size detail views of the rub-iron.

The following disadvantages were inseparable from the use of a rubber band stretched upon the outside of sections to hold them together by its elasticity in contraction: First, the position of the rubber exposed it to moisture, dirt, and other deteriorating agencies, to which its condition of tension made it unusually sensitive; and, second, while, as in the case of any other spring, its strength was greater at the start, there was no way of renewing its elasticity when partially impaired by use. But in this improved link the rubber, in the form of a solid block, is embedded in a box completely protecting it, its elastic force is developed through compression—the form in which elasticity in rubber is longest preserved—and any reserve of elasticity at any time remaining in it can at once, by adjustment, be brought to bear upon the link; and while, without a departure from the principle of this invention, so far as an adjustable spring contained within the link itself, and in combination with the other parts, substantially as shown, is concerned, other forms of spring than the rubber may be used, I prefer the rubber as thus protected and required in only small quantity, as possessing many advantages over any metal spring.

B is a metallic loop, forming the frame for the entire link C, and, while furnishing one-half of the journal of stud D by one of its ends, supplies the nut for the screw at its other. Within the part B are received the studs D D', attached respectively to the sickle and finger bars. Journals are formed for the studs, when within the link, by the loop B, which, bearing upon one-half of stud D, forms one-half of its journal by the intermediate piece, F, concave at each end to conform to one-half of each stud, and by the box G, concave upon one end to form one-half of the journal of stud D', and having the set-screw E from the end of piece B bear against its other. When the screw is tightened the stud D on the movable sickle-bar is drawn toward the other until all of the sections above named are brought to form the journals for both studs, and, in effect, a solid toggle joining them.

To hold the sections F and G within the loop, a groove, *m*, is formed in the inner walls of the piece B, into which fit lugs *f* from the sides of sections F G. Openings *g* in piece B enable these sections to be dropped into the groove and slid past the openings to their proper working positions. The studs assist in holding the removable sections in place by their heads, which, however, project, as shown in Fig. I, on only two sides of the studs, the curves of the projecting heads being coincident with the concavities of ends of pieces F G.

To remove the sections or the entire link C, the screw E is run out and the piece G slid to follow it to make room for the sickle-bar, with stud D, to be moved sufficiently away from stud D' to permit the sickle-bar, with the link, to be lifted from stud D', or the link to be removed from both studs.

The box for the rubber is formed, as seen in partial section, Fig. I, within part G, and the end of the box is closed by a follower, $h$, against which bears the end of screw E.

In practice I form the follower of steel, the box G of hard metal, the loop B of malleable iron, and the section F of soft metal or composition. By these means a simple, strong, and noiseless link is formed, and one in which the rubber, thoroughly protected, is lasting, and a link in which there is no jar at the end of the stroke to crystallize the sickle head or bar, and one in which, at each extreme movement of the bar, the bar is thrown to carry the knives past their dead points or centers to continue their movement in the reverse direction, to thus overcome the difficulty, heretofore inseparable from reaper-knives, of starting with full force each stroke from a full stop.

In Figs. X and XI are shown views of the rub-iron L, for holding the swinging sickle-bar to its bed upon the finger-bar. The peculiarity of its construction is, that instead of letting the side of the sickle-bar come against a shoulder of the finger-bar at the end of its swing each way, where a particle of foreign matter at any place would set off the sickle-bar and limit its swing, and where a continuous surface would offer an opportunity for the accumulation of débris, it interposes a point, $o$, for the sickle-bar to come against, upon which point no trash would be liable to catch, as all trash caught between the point and the bar is cut in two and passed back on each side of the point. The rub-irons, arranged as shown in Fig. IX, together only present a few points to receive the sickle-bar.

Now, having described my invention, what I claim is—

1. In combination with loop B, having set-screw E, and with studs D D' and section F, the box G and follower $h$, forming a compressing mechanism to transmit the elasticity of the rubber or equivalent spring to all of the journal-surfaces of the link, substantially as shown and described.

2. In combination with the sickle-bar and with the finger-bar, the rub-iron L, provided with the bearing-point $o$, arranged to receive the rear edge of the sickle-bar at the end of its sweep each way, as and for the purpose shown and described.

JOSHUA L. ABELL.

Witnesses:
C. S. CARPENTER,
C. H. CARPENTER.